United States Patent
Ledoux

(10) Patent No.: US 11,135,559 B2
(45) Date of Patent: Oct. 5, 2021

(54) ANTI-CAKING PROPERTIES OF AMMONIUM NITRATE PARTICLES THAT ARE STORED IN A CLOSED CONTAINER

(71) Applicant: YARA INTERNATIONAL ASA, Oslo (NO)

(72) Inventor: Francois Ledoux, Cormeilles en Parisis (FR)

(73) Assignee: YARA INIERNATIONAL ASA, Oslo (NO)

( * ) Notice: Subject to any disclaimer, the term of this patent is extended or adjusted under 35 U.S.C. 154(b) by 76 days.

(21) Appl. No.: 16/495,195

(22) PCT Filed: Jun. 22, 2018

(86) PCT No.: PCT/EP2018/066790
§ 371 (c)(1),
(2) Date: Sep. 18, 2019

(87) PCT Pub. No.: WO2018/234553
PCT Pub. Date: Dec. 27, 2018

(65) Prior Publication Data
US 2020/0016556 A1    Jan. 16, 2020

(30) Foreign Application Priority Data
Jun. 23, 2017    (EP) .................................... 17177652

(51) Int. Cl.
C05C 1/00    (2006.01)
C05C 1/02    (2006.01)
(Continued)

(52) U.S. Cl.
CPC .................. B01J 2/30 (2013.01); B01J 20/04 (2013.01); C01C 1/185 (2013.01); C05C 1/00 (2013.01); C05C 1/02 (2013.01); *C01P 2004/60* (2013.01)

(58) Field of Classification Search
None
See application file for complete search history.

(56) References Cited

U.S. PATENT DOCUMENTS 2,616,787 A * 11/1952 Whetstone .............. C06B 23/00
423/268
3,027,267 A * 3/1962 Alleman ................... C05C 1/02
427/180

(Continued)

FOREIGN PATENT DOCUMENTS

EP    3056479 A1    8/2016
WO    9401366 A1    1/1994
(Continued)

*Primary Examiner* — Wayne A Langel
(74) *Attorney, Agent, or Firm* — Dilworth IP, LLC

(57) ABSTRACT

The present application relates to a closed container containing ammonium nitrate (AN) particles in an amount of 91 to 99.75 weight % and desiccant in an amount of 0.25 and 9 weight %, wherein the AN particles have a water content of between 0 and 0.7 weight %, and the desiccant particles comprise between 50 and 95 weight % of AN and between 5 and 50 weight % of magnesium nitrate dispersed in the AN. The application furthermore relates to a method for producing of ammonium nitrate particles that are stored in a closed container and having improved anti-caking properties.

20 Claims, 1 Drawing Sheet

(51) Int. Cl.
    *B01J 2/30*     (2006.01)
    *B01J 20/04*     (2006.01)
    *C01C 1/18*     (2006.01)

(56) References Cited

U.S. PATENT DOCUMENTS

| | | | | |
|---|---|---|---|---|
| 3,030,179 | A | * | 4/1962 | Mcfarlin .................. C01C 1/18 423/265 |
| 3,073,693 | A | * | 1/1963 | Nielsson .................. C05G 1/00 71/13 |
| 3,428,418 | A | * | 2/1969 | McFarlin ................ C01C 1/185 423/275 |
| 4,438,083 | A | * | 3/1984 | Willems .................. C01F 5/38 423/266 |
| 2015/0175491 | A1 | * | 6/2015 | Ledoux .................. C05C 9/005 71/30 |
| 2015/0210604 | A1 | * | 7/2015 | Ledoux .................. C05C 9/005 71/30 |
| 2015/0218058 | A1 | * | 8/2015 | Ledoux .................... C05C 1/00 71/30 |

FOREIGN PATENT DOCUMENTS

| | | | |
|---|---|---|---|
| WO | 0007938 | A1 | 2/2000 |
| WO | 2014033159 | A2 | 3/2014 |

* cited by examiner

ANTI-CAKING PROPERTIES OF AMMONIUM NITRATE PARTICLES THAT ARE STORED IN A CLOSED CONTAINER

TECHNICAL FIELD

The present application relates to improving the anti-caking properties of ammonium nitrate particles that are stored in a closed container.

BACKGROUND

Ammonium nitrate (AN) ($NH_4NO_3$) is a hygroscopic chemical compound and when left in contact with moisture and moist air, it absorbs moisture through which particles will lose some of their physical properties, more particularly for storage and handling properties (e.g. the particles may become weak and lose their hardness, or become compressible or prone to thermocycling and degranulation, etc.) and tend to cake during storage. Caking is when the particles stick to each other and form agglomerates.

Solid ammonium nitrate particles may be produced in the form of prills, granules, pastilles, flakes or crystals. Prills for example can be produced in either high or low density form, depending on the production process (in particular the concentration of the AN melt prior to prilling). Depending on the intended application of the product, different types of ammonium nitrate products are desirable. High density ammonium nitrate prills or granules are typically applied for fertilizers. So-called Technical Ammonium Nitrates (TAN) are applied in non-fertilizer applications, such as for example for the explosives and propellants industry or in some medical applications. Different TAN grades can be distinguished such as e.g. crystalline grade which has a high density as well as ANE (ammonium nitrate for emulsions). Porous prills of ammonium nitrate (ANPP) which have a low density are primarily used as a solid oxidizer ingredient for explosive compositions such as ANFO, WR ANFO, heavy ANFO, emulsions or water gels.

As long as AN particles are handled, they are exposed to air and they have the ability to take up moisture. To maintain a good quality product during storage, one aspect to consider is the water content of the product, which means to start by producing particles with a relatively low water content and then to keep this water content relatively low throughout the life cycle of the product. In this context, relatively low water content means that there is little "free water" available for caking and instead that most water is or becomes bound and without being bound by theory becomes unavailable to generate caking of the AN particles.

Magnesium nitrate ($Mg(NO_3)_2$) is an additive used to serve as a desiccant in AN. A desiccant is a hygroscopic substance that induces or sustains a state of dryness in its vicinity. Without being bound by theory, the mode of action of magnesium nitrate is through water binding by formation of double salts, several moles of water can be bound by one single mole of magnesium nitrate under ambient conditions. If the water content of the AN particles is actually bound by magnesium nitrate, it is no longer free and the caking tendency can be significantly reduced and physical properties improved.

One possible method is to add and mix pure magnesium nitrate solid particles to the AN solid particles. One problem therewith however is that it is difficult to remove a sufficient amount of water out of the magnesium nitrate particles to enable them to absorb a sufficient amount of water out of the AN particles. Removing most of the water out of pure magnesium nitrate particles requires a relatively high temperature. However, when such high temperatures are applied, magnesium nitrate can convert into a glassy state thereby reducing the water binding capacities of such magnesium nitrate particles. It can thus be technically challenging to produce pure magnesium nitrate solid particles with sufficient water binding capabilities.

The most commonly used method is to add magnesium nitrate to the AN melt prior to formation of the final particles, typically in an amount of 1-2 weight %. Nevertheless, there are also problems associated with this. For example when ANPP is produced by prilling, the porosity is generated by keeping some water in the prill and subsequent evaporation of the water by passing the prills through dryers. The water removed from the prill leaves behind some porosity that is desired and ANPP can then absorb fuel oil to form the well-known and popular explosive ANFO (ammonium nitrate fuel oil). Drying the prilled AN to form ANPP requires the dryer to operate at a temperature where most of the hydration water present in magnesium nitrate may not actually be removed in practice, meaning that the desiccant effect of the magnesium nitrate would be much reduced. In addition, when ANPP is applied as a solid oxidizer ingredient for explosive compositions, the ANPP particles need to be able to absorb a sufficient amount of fuel in a uniform way to enhance reactivity. When magnesium nitrate is added into the melt before formation of the final particles, the magnesium nitrate reduces or modifies the porosity formation of the ANPP through which the absorption capacity of the particles is reduced consequently reducing the quality as an oxidizer for explosive compositions. Another option is described in WO 00/07938, where ammonium nitrate products having an improved thermal stability are described. In this patent application, it is disclosed that a solid drying agent is mechanically mixed with ammonium nitrate particles. The solid drying agent is described as being either an inert water absorbing inorganic compound such as silicagel or being AN particles containing magnesium nitrate or being coated with magnesium nitrate. It is not described in any detail what is meant by the AN particles containing magnesium nitrate and the WO'938 application discloses that the drying effect was obtained by mechanically mixing and evenly distributing the drying agent with the AN particles, and only describes experiments having been done where AN particles were coated with magnesium nitrate.

It is consequently a goal of the present application to provide a solution that uses magnesium nitrate as a desiccant in such a way as to maximize the desiccant effect thereof and to minimize as much as possible the caking of AN particles without having to evenly distribute the desiccant with the AN particles. It is furthermore a goal of the application to take care that the magnesium nitrate as desiccant has a minimal negative influence on the final application and properties of the AN particles, including for example the porosity thereof, and the largest positive influence on final application of AN particles and in particular its physical properties.

SUMMARY

According to a first aspect of the present application, a closed container is described containing AN particles in an amount of 91 to 99.75 weight % and desiccant in an amount of 0.25 and 9 weight %, wherein
the AN particles have a water content of between 0 and 0.7 weight %; and the desiccant comprises particles containing between 50 and 95 weight % of AN and between 5 and 50 weight % of magnesium nitrate dispersed in the AN.

By adding desiccant to the AN particles in the container, the desiccant takes up at least some of the moisture of the AN particles preventing or limiting the amount of caking. Only a relatively minor amount of desiccant compared to AN particles needs to be added in order to obtain a sufficient desiccant effect. A further important advantage is that the desiccant does not have to be evenly distributed between the AN particles to have the desired desiccant effect. The desiccant can be located in one place in the closed container, and surprisingly there is no need to mechanically mix the desiccant within the bulk AN. Of course, the same desiccant effect will be obtained when the desiccant is distributed amongst the AN particles. Since a minor amount of desiccant is added to the AN particles, the overall porosity of the product (AN particles added with dessicant) is not or only minorly influenced compared to AN particles with no dessicant added allowing good fuel oil absorption, as well as the influence on the final application of the AN particles. On the contrary, the porosity of the AN particles is actually improved since the physical properties of the product are better preserved throughout the life-cycle of the product; the product will degrade less and keep more of its original qualities. Another advantage of adding desiccant particles containing magnesium nitrate to the AN particles is that, if for any reason, the water content of the AN particles is higher than normal, for instance when a drying equipment of the AN particles is malfunctioning or when the climatic conditions may limit the operation of the production factory at its maximum demonstrated rate, adding additional desiccant to the AN particles prior to bagging can easily compensate for that or any similar problem. This results in improved operation and uptime of the production factory. Another advantage of adding desiccant particles containing magnesium nitrate is that it is chemically of the same nature as ammonium nitrate, it is also fully water soluble, and does not dilute but contributes to the overall intended effect in most applications of AN, for example the oxidiser effect for explosive purposes.

In an embodiment according to the application, the closed container contains between 94 and 97 weight % of AN particles and between 3 and 6 weight % of desiccant, wherein the desiccant comprises between 88 and 93.3 weight % AN, between 6 and 10 weight % magnesium nitrate dispersed in the AN and between 0.7 and 2 weight % of water.

In a more specific embodiment of a closed container according to the application, the final concentration of magnesium nitrate in the total amount of AN particles and desiccant together is between 0.12 and 4.5 weight %, more particularly between 0.12 and 2 weight %, even more particularly between 0.12 and 1 weight % and most particularly between 0.12 and 0.45 weight %.

According to an embodiment, the total amount of AN particles and desiccant adds up to 100 weight %. In other words, in such embodiments no other additive except for the desiccant is added to the AN particles. In other embodiments, other additives may be present. For example, it is common when making ANPP that an internal additive be added to form good porosity.

In an embodiment of a closed container according to the application, the AN particles and the desiccant particles have the same shape and the same average particle size. This results in desiccant particles that are not distinguishable from the AN particles and consequently not visible. This is particularly relevant when the magnesium nitrate concentration in the desiccant is on the low side and/or amount of desiccant required rather high and less relevant when the desiccant is highly concentrated in magnesium nitrate or amount required very low. For example, when only 0.5 weight % of desiccant is blended with 99.5 weight % of AN particles, the shape or size of particles of desiccant is less relevant than when, for example, 5 weight % of desiccant is blended with 95 weight % of AN particles.

In a possible embodiment of a closed container according to the application, the weight-based average particle size of the AN particles and the particles of desiccant ranges from 0.05 to 10.00 mm. The weight-based average particle size of the AN particles and the particles of desiccant ranges in particular ranges from 0.10 to 7.50 mm, more in particular from 0.50 to 5.00 mm, still more in particular from 0.75 to 3.00 mm and most in particular from 1.00 to 2.00 mm.

In an embodiment of a closed container according to the application, the AN particles are ANPP having a water content of between 0.05 and 0.3 weight %.

Adding desiccant to ANPP will have no adverse impact on the safety of the ANPP but improves it by preventing caking, dust formation, etc. Further, the magnesium nitrate present in the desiccant will even assist in the explosion capacity when the mixture of ANPP and the desiccant is used as a solid oxidizer ingredient for explosive compositions due to the nitrate content present.

In another embodiment of a closed container according to the application, the AN particles are ANPP, high density AN, or AN containing fertilizers. In more particular embodiments, the high density AN may be high density AN prills, granules or crystals.

Since magnesium is a secondary nutrient when AN is used as a fertilizer, and moreover magnesium in magnesium nitrate is in a water-soluble form and as such directly available for crop uptake, the addition of desiccant particles to high density AN prills or granules or to AN based fertilizers, will have a positive impact on the fertilizer properties of the AN particles.

In a particular embodiment of the application, the AN particles have a water content of between 0.01 and 0.5 weight %, more particularly between 0.02 and 0.3 weight %.

In an embodiment of a closed container according to the application, the closed container is a closed big bag.

According to a second aspect of the present application, a method is disclosed for storing ammonium nitrate (AN) particles with improved anti-caking properties, wherein the method comprises the steps of:
producing AN particles having a water content of between 0 and 0.7 weight %;
producing desiccant comprising particles containing between 50 and 95 weight % of AN and between 5 and 50 weight % of magnesium nitrate dispersed in the AN;
filling a container with an amount of between 0.25 and 9 weight % of desiccant and between 91 and 99.75 weight % of AN-particles; and
closing the container.

According to an embodiment of the application, the method comprises the steps of:
producing AN particles having a water content of between 0 and 0.6 weight %;
producing a desiccant comprising particle containing between 88.8 and 93.3 weight % AN, between 6 and 10 weight % magnesium nitrate dispersed in the AN and between 0.7 and 1.2 weight % of water;

filling a container with between 3 and 6 weight % of desiccant and between 94 and 97 weight % of AN particles;

closing the container.

In an embodiment according to the application, the method steps of producing the desiccant comprising particles as described above comprises the steps of:

reacting ammonia and nitric acid in a reactor to form aqueous ammonium nitrate;

passing the aqueous ammonium nitrate through at least one evaporator to form an ammonium nitrate stream with less than 6 weight % water;

adding a magnesium containing compound to the nitric acid prior to addition to the reactor, or to the reactor directly, or to the aqueous ammonium nitrate before entry to the evaporator, or when there is more than one evaporator before entry to the final evaporator; and solidifying the ammonium nitrate comprising magnesium nitrate dispersed in the ammonium nitrate.

The magnesium containing compound may be an aqueous magnesium nitrate solution.

In a particular embodiment, the solidifying step may comprise prilling, granulating, flaking or pastillating.

In another particular embodiment of the method, the water content of the ammonium nitrate stream before solidifying is less than 3 weight %, more particularly less than 2 weight % or even more particularly less than 1 weight %.

In yet another embodiment according to the application, the method further comprises the step of coating the desiccant with an organic or mineral composition. The coating may be used to minimize moisture pick up before filling them into the container. Examples of organic coatings that can be used to minimize caking and/or moisture pick up are amongst others coating oils and mixtures such as wax, waxy surfactants, paraffin, polymers, etc. Such coating typically also include known additives such as e.g. amines etc. Examples of corresponding mineral coatings that minimize caking and/or moisture pick up are amongst others powders such as talcum, clay, etc.

In another embodiment of the method according to the application, in the step of producing AN particles, ammonium nitrate porous prills (ANPP) having a water content of between 0.05 and 0.3 weight % are produced.

In another embodiment of the method according to the application, in the step of producing AN particles, high density ammonium nitrate prills or granules having a water content of between 0.05 and 0.5 weight % are produced.

In another embodiment of the method according to the application, the AN particles are coated with an organic or mineral composition to minimize caking and moisture pick up.

In a particular embodiment of the method according to the application, the container is a big bag.

In an embodiment of the method according to the application, a closed container according to the application as described above is produced.

BRIEF DESCRIPTION OF THE DRAWINGS

Embodiments of the invention are further described hereinafter with reference to the accompanying drawings, in which.

DETAILED DESCRIPTION

Figure 1:
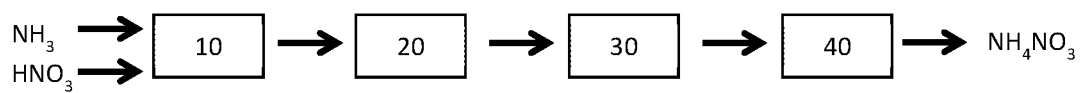
FIG. 1 is a simplified schematic of a method of making AN particles.

One way to keep the water content low is to store and handle the product in a container. Examples of closed containers are amongst others closed drums, closed bags and more particularly closed big bags. A big bag, also called a FIBC (flexible intermediate bulk container), bulk bag or super sack, is an industrial container made of a flexible fabric that is designed for storing and transporting dry, solid products that will ideally remain flowable. The container can be closed by any conventional manner and in the case of bags, they can be closed by heat sealing or with a collar. A small bag refers to bags, that when full, are not too heavy to be handled manually without the use of specialized equipment or machines, typically from around 20 kg to a maximum of 50 kg. In comparison, big bags are typically around 1000 kg, for example between 800 and 1200 kg or between 600 and 1500 kg. The use of a closed container can reduce caking compared to bulk storage, however, desiccant is still beneficially added.

Once inside the container, such as a bag, the particles can be exposed to excessive pressure due to e.g. piling of the bags, that will lead to caking especially in the bags at the bottom when they are stacked. Further, the particles may also take up moisture because e.g. the bag can be damaged and/or if the closing is not completely water tight and/or if the material used in making the bag is not completely water impermeable. Furthermore, AN particles that are stored in closed containers can be exposed to temperature fluctuations and mechanical stress, especially AN particles that are shipped overseas and are stored in big bags over long time periods. The temperature fluctuations and mechanical stress can induce damage to the product, for example phase changes in the AN particles causing dust formation and caking. In the solid state, AN presents several crystalline phases and changes around phase transition temperatures that imply variations in the structure and the density of the particles. This phenomenon is known as thermal swelling and can lead to degranulation, dust generation, and caking. Phase changes that occur around 32.3° C. which can easily occur in different climates or seasons (for example sun exposure implies local higher temperatures in the product, etc.) encourage the degranulation and caking tendency of the AN particles. Thus, even relatively small amounts of water in the particles in the container can have a significant effect on caking.

The use of desiccant can be used with any size of container, and the benefits of reduced caking will be seen with any closed container. Nevertheless, processability becomes a more important issue with larger volumes of AN particles, and thus including desiccant has a more significant effect for big bags as compared to, for example, small bags.

The present application relates to a closed container that contains AN particles and desiccant particles, this in an amount of 91 to 99.75 weight % of AN particles and 0.25 to 9 weight % of desiccant particles. In an embodiment, the total amount of AN particles and desiccant particles add up to 100 weight % but in other embodiments, other additives or products could be present in the AN particles or blended with it.

The desiccant particles comprise between 50 and 95 weight % AN and between 5 and 50 weight % magnesium nitrate ($Mg(NO_3)_2$). The magnesium nitrate is dispersed throughout the desiccant. After mixing the desiccant with the AN particles, the magnesium nitrate can be expressed as $Mg(NO_3)_2 \cdot xH_2O$ and typically has a molar concentration of water of x between 0 and 6. To have good water binding capacities, x should be as low as possible and typically be below 4.5. Values of x below 6 have been seen to maintain good anticaking properties in the AN particles. Values of x below 4.5 will additionally maintain good anti-swelling properties in the AN particles. Values of x even lower allows for an extra buffer in case of any problems or other issues that may arise during storage. Values of x above 6 typically indicate that the magnesium nitrate has lost its ability to bind additional water.

The desiccant particles comprise between 50 and 95 weight % of AN and between 5 and 50 weight % of magnesium nitrate. The desiccant particles can also comprise water. In a possible embodiment, the desiccant particles, prior to being added in the container, comprise:
between 88.8 and 93.3 weight % AN,
between 6 and 10 weight % magnesium nitrate dispersed in the AN; and
between 0.7 and 1.2 weight % of water.

The ability of the desiccant to act as a desiccant depends directly on its ability to bind water, thus its original water content and the amount of magnesium nitrate present. When the desiccant contains larger amounts of magnesium nitrate, then less desiccant is needed. Conversely, when the desiccant contains less magnesium nitrate then larger amounts of desiccant is needed. Accordingly, it can also be useful to consider the total concentration of magnesium nitrate compared to the total amount of AN particles and desiccant particles. The concentration of magnesium nitrate can thus be considered to be between 0.12 and 4.5 weight %, or between 0.12 and 2 weight %, even more in particular between 0.12 and 1 weight % and most particularly between 0.12 and 0.45 weight % of the total composition of AN particles and desiccant particles.

The industrial production of AN particles entails the following acid-base reaction of nitric acid with ammonia:

$$HNO_3 + NH_3 \rightarrow NH_4NO_3. \quad (1)$$

FIG. 1 illustrates a simplified process of making AN particles. Ammonia is used in its gas form and the nitric acid is concentrated, containing typically more than 50% acid and less than 50% water. Ammonia and nitric acid are added to AN reactor (10). After the AN solution is formed, typically at about 80-83% concentration, the solution is directed towards a first evaporator (20) and excess water is normally evaporated to an ammonium nitrate (AN) content of about 95% (for example, from 93 to 98%). This more concentrated AN solution may then be sent to a second evaporator (30) to produce nearly anhydrous to 98-99.9% concentration, also called an AN melt, depending on grade. In some embodiments, the AN melt has less than 3 weight % water, less than 2 weight % water, or even less than 1 weight % water. In this example, two evaporators are used but in some systems, only one evaporator is necessary to produce the AN melt or alternatively, three or more evaporators could be used. Alternatively, the AN solution can directly be produced at 93-98% concentration directly in the reactor, depending the strength of the available nitric acid and the overall optimisation of the process based on multiple criteria (energy balance, recycling of scrubbing solution from e.g. vapors treatment, capital expenditure, etc).

The AN melt can then be further processed by solidifying in a solidifier (40). Prilling, granulating, flaking or pastillating are all examples of common solidifying steps. For example, the AN melt can be solidified into different forms as desired such as prills (or small beads) that are produced in a prilling or spray tower or into granules by spraying and tumbling in a rotating drum or fluidizing in a fluidized bed granulator or pastillated on a pastillation belt or flaked. The solid particles of AN are then further cooled.

As already described above, depending on the application, also the AN particles can have different forms and different grades.

Figure 2:
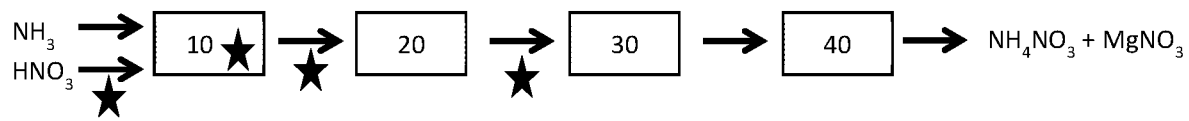
FIG. 2 is a simplified schematic of a method of making a desiccant comprising particles containing AN with magnesium nitrate dispersed in the AN.

For forming the desiccant particles containing both AN and magnesium nitrate dispersed therein, the same process as used to make the AN particles can also be used, with the addition of a magnesium containing compound. This is shown in FIG. 2 where a star is used to indicate the different potential points where the magnesium containing compound can be added. For example, the magnesium containing compound may be added to the nitric acid prior to addition to the AN reactor (10), or to the AN reactor (10) directly, or to the AN stream prior to the first evaporator (20) or prior to the second evaporator (30). An ammonium nitrate-magnesium nitrate melt is thus formed that can be solidified as described above to produce the desiccant.

In theory, the magnesium nitrate would be homogeneously dispersed throughout the desiccant. However, in practice, during cooling and crystallisation of the desiccant, the first crystals to form may be richer or poorer in magnesium nitrate compared to the crystals to form at a colder temperature. Without being bound by theory, this may be due to the eutecticum of AN and magnesium nitrate and the overall composition. Notwithstanding the presence of some localized and crystallized magnesium nitrate, the magnesium nitrate can be considered as being dispersed throughout the desiccant particle as a whole.

Typically, magnesium nitrate is added as an aqueous magnesium nitrate solution. Therefore, it is desirable to add the magnesium containing compound prior to the final evaporator and formation of the ammonium nitrate-magnesium nitrate melt. If the magnesium nitrate aqueous solution were added to an ammonium nitrate melt, then additional water would be present that would typically need to be removed before any solidification step. As with the AN particles described above, before solidification, it is desirable to have less than 3 weight % water in the ammonium nitrate-magnesium nitrate melt, more particularly less than 2 weight % water and even more particularly less than 1 weight % water.

The magnesium nitrate solution may be made by any conventional method or purchased as such. For example, one can react magnesium oxide or magnesium carbonate with nitric acid to produce magnesium nitrate.

Instead of adding magnesium nitrate as an aqueous solution, magnesium nitrate can also be formed in situ in the AN solution by for example the reaction of magnesium oxide or magnesium carbonate and nitric acid, or added in alternative form such as solid magnesium nitrate comprising crystallised water (double salt of magnesium nitrate and water).

After production of the AN particles, these can be coated with organic or mineral coatings that minimize caking and/or moisture pick up. Coatings are well known in the art and are typically of an organic or mineral composition. In case of ANPP anticaking, the ANPP can be coated before being bagged together with the desiccant particles.

The desiccant particles are not necessarily coated but doing so can be advantageous in some situations. For example, coating the desiccant particles can limit moisture pick up prior to bagging or can be used to apply a certain color to make the desiccant particles invisible or more visible depending the color of the product to be blended with. The coating is typically applied before the AN and the desiccant particles are filled into the container.

The weight-based average particle size of the AN particles and the desiccant particles ranges from 0.05 to 10.00 mm. The weight-based average particle size of the AN particles and the particles of desiccant ranges in particular ranges from 0.10 to 7.50 mm, more in particular from 0.50 to 5.00 mm, still more in particular from 0.75 to 3.00 mm and most in particular from 1.00 to 2.00 mm. The weight-based average particle size is a term commonly used to describe the mean diameter of the particles where half of the weight of the particles have a larger diameter and half of the particles have a smaller diameter. The size of such particles are commonly measured by sieve analysis. It can be advantageous for the desiccant particles to have similar weights and dimensions to the AN particles but this will not have an effect on the ability of the desiccant to act as a desiccant within the container. Similarly, the desiccant can be dispersed throughout the container or the desiccant can be in one or multiple localized areas within the container and in either case, the ability of the desiccant to act as a desiccant is not expected to vary.

The AN particles typically have a water content of between 0 and 0.7 weight %, more particularly between 0.01 and 0.5 weight %, and even more particularly between 0.02 and 0.3 weight %. When the AN particles are in the form of ANPP for explosive use, the water content typically is between 0.05 and 3 weight %. When AN particles are in the form of high density AN prills or granules to be used in fertilizers, the water content typically is between 0.05 and 0.5 weight %.

The water content of all particles as disclosed in this application can be determined by the standard Karl-Fisher titration method using CombiTitrant2 of Merck Millipore as Karl-Fisher reagent.

The present application furthermore relates to a method for producing a closed container containing the amount of AN and desiccant particles as described above. This method comprises the steps of producing the AN particles and the desiccant as described above, filling them in the amount as described above and closing the container.

The application is typically applicable to ANPP that are used as a solid oxidizer ingredient for explosive compositions, since these are porous particles that are prone to caking. Also for crystalline AN, this application is very suitable as many applications of crystalline AN can tolerate the presence of magnesium nitrate but cannot tolerate the presence of traditional coating (oil and wax with active ingredients such as amines, alkylsulphonates, etc) and therefore cake soon after bagging, even at relatively low water content.

EXAMPLES

In table 1 below, the amount of water expressed in weight % was measured for different weight % of magnesium nitrate in desiccant particles produced in a pilot plant. In other terms, particles containing e.g. 22% of magnesium nitrate can contain as low water content as particles containing 6% of magnesium nitrate or very close to it.

TABLE 1

| weight % of magnesium nitrate in desiccant particles | weight % of water in desiccant particles, measured by mentioned Karl-Fisher titration method |
|---|---|
| 6 | 0.7 |
| 9 | 0.8 |
| 12 | 1.0 |
| 22 | 1.5 |

As can be deducted from table 1, it has surprisingly been found that, the higher the weight % of magnesium nitrate in the desiccant particles, the lower the amount of water there is proportionally to the magnesium nitrate, i.e. the more active is the magnesium nitrate. This means that the higher the magnesium nitrate-content in the desiccant particles, the more water these particles can take up, the better the desiccant effect.

In table 2 below, a number of examples are given of possible embodiments with different amounts of magnesium nitrate in weight % added in the desiccant particles, different amounts of desiccant in weight % added in the total amount of AN particles and desiccant particles and the final concentration in weight % of magnesium nitrate in the total amount of AN particles and desiccant particles.

TABLE 2

| weight % of magnesium nitrate in desiccant particles | weight % of desiccant particles in total amount of AN particles and desiccant particles | weight % of magnesium nitrate in the total amount of AN particles and desiccant particles |
|---|---|---|
| 6 | 0.25 | 0.015 |
|  | 7.0 | 0.450 |
|  | 9.0 | 0.540 |
| 9 | 0.25 | 0.023 |
|  | 5.0 | 0.450 |
|  | 9.0 | 0.810 |
| 20 | 0.25 | 0.050 |
|  | 2.5 | 0.500 |
|  | 9.0 | 1.800 |
| 50 | 0.25 | 0.125 |
|  | 1.0 | 0.500 |
|  | 9.0 | 4.500 |

The invention claimed is:

1. A closed container comprising particles, the particles comprising ammonium nitrate (AN) particles in an amount of 91 to 99.75 weight % and desiccant particles in an amount of 0.25 and 9 weight % based on the total weight of particles, wherein
   the AN particles have a water content of between 0 and 0.7 weight %; and
   the desiccant particles contain between 50 and 95 weight % of AN and between 5 and 50 weight % of magnesium nitrate dispersed in the AN,
   wherein the final concentration of magnesium nitrate in the container particles is between 0.12 and 4.5 weight % of the total weight of AN and desiccant particles.

2. The closed container according to claim 1, wherein the AN particles are ANPP, high density AN, or AN containing fertilizers.

3. The closed container according to claim 2, wherein the AN particles are ANPP.

4. The closed container according to claim 1, wherein the water content of the AN particles is between 0.01 and 0.5 weight %.

5. The closed container according to claim 4, wherein the water content of the AN particles is between 0.02 and 0.3 weight %.

6. The closed container according to claim 1, wherein the final concentration of magnesium nitrate in the container particles is between 0.12 and 1 weight % of the total weight of AN and desiccant particles.

7. The closed container according to claim 1, wherein the total amount of AN and desiccant particles adds up to 100 weight %.

8. The closed container according to claim 1, wherein the closed container is a closed flexible intermediate bulk container holding 600 to 1500 kg when full.

9. A closed container comprising ammonium nitrate (AN) particles in an amount of 94 to 97 weight % wherein the AN particles have a water content of between 0.7 and 2 weight %; and the desiccant particles contain between 50 and 95 weight % of AN and between 5 and 50 weight % of magnesium nitrate dispersed in the AN, wherein the final concentration of magnesium nitrate in the container is between 0.12 and 0.45 weight % of the total weight of AN and desiccant particles.

10. A method for storing ammonium nitrate (AN) particles with improved anti-caking properties, wherein the method comprises the steps of:
producing AN particles having a water content of between 0 and 0.7 weight %;
producing desiccant particles containing between 50 and 95 weight % of AN and between 5 and 50 weight % of magnesium nitrate dispersed in the AN;
filling a container with an amount of between 0.25 and 9 weight % of the desiccant particles and between 91 and 99.75 weight % of the AN particles; and
closing the container after the container is filled.

11. The method according to claim 10, wherein the step of producing the desiccant particles comprises the steps of:
reacting ammonia and nitric acid in a reactor to form aqueous ammonium nitrate;
passing the aqueous ammonium nitrate through at least one evaporator to form an ammonium nitrate stream with less than 6 weight % water;
adding a magnesium containing compound to the nitric acid, said addition being made by at least one of: prior to addition to said reactor, to said reactor directly, to the aqueous ammonium nitrate before entry to said evaporator, and when there is more than one evaporator before entry to the final evaporator; and
solidifying the ammonium nitrate comprising magnesium nitrate dispersed in the ammonium nitrate.

12. The method according to claim 11, wherein the water content of the ammonium nitrate stream before solidifying is less than 3 weight %.

13. The method according to claim 12, wherein the water content of the ammonium nitrate stream before solidifying is less than 2 weight %.

14. The method according to claim 13, wherein the water content of the ammonium nitrate stream before solidifying is less than 1 weight %.

15. The method according to claim 11, wherein the magnesium containing compound is an aqueous magnesium nitrate solution.

16. The method according to claim 11, wherein the solidifying step comprises prilling, granulating, flaking or pastillating.

17. The method according to claim 11, wherein the method further comprises a step of coating the desiccant particles with an organic or mineral composition.

18. The method according to claim 10, wherein the AN particles are coated with an organic or mineral composition.

19. The method according to claim 10, wherein the container is a flexible intermediate bulk container holding 600 to 1500 kg when full.

20. A method for producing a closed container with particles comprising:
producing AN particles having a water content of between 0 and 0.7 weight %;
producing desiccant particles containing between 50 and 95 weight % of AN and between 5 and 50 weight % of magnesium nitrate dispersed in the AN;
filling a container with an amount of between 0.25 and 9 weight % of the desiccant particles and between 91 and 99.75 weight % of the AN particles; and
closing the container after the container is filled.

* * * * *